United States Patent
McCarty et al.

(10) Patent No.: US 8,312,484 B1
(45) Date of Patent: Nov. 13, 2012

(54) SYSTEMS AND METHODS FOR BLOCKING SELECTED COMMERCIALS

(75) Inventors: Michael K. McCarty, Burbank, CA (US); Marvin Charles Carlberg, Los Angeles, CA (US)

(73) Assignee: United Video Properties, Inc., Los Angeles, CA (US)

( * ) Notice: Subject to any disclaimer, the term of this patent is extended or adjusted under 35 U.S.C. 154(b) by 724 days.

(21) Appl. No.: 12/062,283

(22) Filed: Apr. 3, 2008

Related U.S. Application Data

(60) Provisional application No. 61/040,205, filed on Mar. 28, 2008.

(51) Int. Cl.
*H04N 7/16* (2006.01)

(52) U.S. Cl. ............... 725/28; 725/25; 725/27; 725/29; 725/30; 725/31; 725/40; 725/43; 725/46; 725/47

(58) Field of Classification Search .................... 725/25, 725/27–31, 40, 43, 46–47
See application file for complete search history.

(56) References Cited

U.S. PATENT DOCUMENTS

| | | | | |
|---|---|---|---|---|
| 6,075,550 | A * | 6/2000 | Lapierre | 725/25 |
| 6,675,384 | B1 * | 1/2004 | Block et al. | 725/28 |
| 2003/0131356 | A1 * | 7/2003 | Proehl et al. | 725/58 |
| 2003/0192045 | A1 * | 10/2003 | Fellenstein et al. | 725/29 |
| 2004/0010798 | A1 * | 1/2004 | Galli et al. | 725/28 |
| 2004/0019904 | A1 * | 1/2004 | Fellenstein et al. | 725/32 |
| 2004/0128681 | A1 * | 7/2004 | Hancock et al. | 725/30 |
| 2005/0160258 | A1 * | 7/2005 | O'Shea et al. | 713/154 |
| 2006/0026655 | A1 * | 2/2006 | Perez | 725/91 |
| 2006/0064715 | A1 * | 3/2006 | Poslinski | 725/28 |
| 2007/0204288 | A1 * | 8/2007 | Candelore | 725/28 |
| 2007/0214470 | A1 * | 9/2007 | Glasgow et al. | 725/10 |
| 2007/0220543 | A1 * | 9/2007 | Shanks et al. | 725/28 |
| 2009/0222853 | A1 * | 9/2009 | White et al. | 725/34 |

* cited by examiner

*Primary Examiner* — Jason Salce
(74) *Attorney, Agent, or Firm* — Ropes & Gray LLP

(57) ABSTRACT

Systems and methods for blocking inappropriate or undesired media content. Commercials are reviewed and assigned ratings or other attributes. Metadata including one or more flags identifying a commercial's rating or other attribute is embedded or inserted into media guidance application data for the commercial or for the media content during which the commercial is to be displayed. The media guidance application data is then sent to a viewer's equipment. The equipment receives the media guidance application data, parses the data for the metadata, and then determines if the commercial can be displayed based on parental control restrictions set by a user.

41 Claims, 12 Drawing Sheets

US 8,312,484 B1

SYSTEMS AND METHODS FOR BLOCKING SELECTED COMMERCIALS

This application claims the benefit of U.S. Provisional Application No. 61/040,205, filed Mar. 28, 2008, the disclosure of which is hereby incorporated by reference herein in its entirety.

BACKGROUND OF THE INVENTION

Embodiments of the invention relate generally to media systems and methods, and more particularly, to media systems and methods for blocking inappropriate or undesired commercials during the display of media content.

The amount and variety of media content available to viewers has increased dramatically in recent years. In addition to hundreds of conventional broadcast television channels, consumers may now access a nearly limitless amount of video and other content via computers, mobile phones, and other wired and wireless broadband devices.

With the proliferation of available media content, many parents are concerned that their children may be watching programs more suitable for adults. In response, the television industry designed a TV ratings system to give parents more information about the content and age-appropriateness of TV programs. These ratings, called the TV Parental Guidelines, are modeled after the familiar movie ratings.

The TV Parental Guidelines may be used by V-Chips, set-top boxes, and similar devices to block objectionable programs or channels. A V-Chip is a device built into most newer television sets that electronically reads television-programming ratings and allows parents or other adults to block objectionable programs. The V-Chip works differently from TV to TV, depending on the manufacturer. The set-up process for a V-Chip is typically found in the TV's on-screen menu options or instruction manual and is controlled through the TV's remote control.

Many set-top boxes implement media guidance applications with advanced parental control capabilities not offered by V-Chips. Features vary by manufacturer and model, but typically allow the blocking of specific programs, all programs that are above a selected TV rating, or even entire channels. Once a block has been created with a V-Chip or set-top box, the programs or channels are blocked until viewing is authorized by the entry of a Personal Identification Number (PIN) or passcode.

Although the TV Parental Guidelines apply to all television programs, including those directed specifically to young children, they unfortunately do not currently apply to commercials, including previews/promotions of other television programming. Therefore, it is not uncommon for a preview of an adult program to be shown during the broadcast of a children's program. This can even occur when a V-Chip or set-top box has been programmed to prevent display of that very same adult program. For example, a parent may set a V-Chip or set-top box to prevent display of the TV program "CSI: NY," but a commercial or preview for this very same program may nevertheless be displayed during broadcast of a children's program. Because previews for upcoming programs often highlight the most violent and/or controversial portions of the programs to attract viewers, they are often more inappropriate for children than the actual programs. In addition to violent or otherwise inappropriate previews, many parents also prefer that their children not watch other types of commercials, such as those advertising alcohol, sugary cereals, or video games. Unfortunately, known media systems and methods do not permit the selective blocking of these and other types of objectionable commercials.

SUMMARY OF THE INVENTION

Embodiments of the present invention solve the above-described problems and provide enhanced systems and methods for blocking inappropriate or undesired media content. Specifically, embodiments of the invention permit selective blocking of commercials such as sponsor advertisements and program previews and promotions.

To implement exemplary embodiments of the invention, commercials are reviewed and assigned ratings similar to the TV Parental Guideline ratings for TV programs. Metadata including one or more flags identifying a commercial's rating may then be embedded or inserted into media guidance application data for the commercial or for the media content during which the commercial is to be displayed. Commercials may instead be analyzed and classified according to their content (e.g. alcohol ads, candy ads) or other attribute. Metadata including one or more flags identifying a commercial's content or other attribute may then be embedded or inserted into media guidance application data for the commercial or its corresponding media content.

The media guidance application data is then sent to a user equipment device such as a television with a set-top box or a computer with a video card. The equipment receives the media guidance application data, parses the data for the metadata, and then determines if the commercial can be displayed in accordance with one or more of the embodiments discussed below.

Instead of gleaning a commercial's rating or content from metadata, such information can be ascertained by analyzing closed captioning data, recognizing certain spoken words or other audio, or even recognizing certain images. A user equipment device may, for example, analyze closed captioning data, recognize audio, or recognize video to locate certain words such as "beer" or "alcohol" or certain images such as liquor bottles, and then determine if the commercial can be displayed in accordance with one or more of the embodiments discussed below.

In one exemplary embodiment, a user is first provided with the ability to set parental control restrictions for media content and commercials. For example, the user may access a parental control mode provided by a media guidance application implemented with a set-top box and choose to block all media content and commercials with a rating of TV-Y7 or higher. Alternatively, the user may choose to block all commercials with a particular content, such as commercials advertising alcohol. When a child (or anyone else) requests to view a media content, the media content and commercials to be displayed with the media content are analyzed to determine if they violate the parental control restrictions. If they do, they are blocked. The blocked commercials may be replaced with more suitable commercials, a blank screen, music, or other replacement media. Because both the media content and the commercials are compared to the parental control restrictions, the media content may be displayed if it does not violate the parental control restrictions even if the commercials do.

In another exemplary embodiment, a rating of a media content and a rating of a commercial scheduled to be displayed during the media content are received and compared. For example, media guidance application data for a media content may be received at a set-top box and parsed to find the ratings of the media content itself and the ratings of commercials scheduled to be displayed with the media content. The ratings are then compared. If the rating of any commercial is higher than the rating of the media content, display of that commercial is blocked. This embodiment permits the blocking of commercials without requiring a user to first set parental control restrictions and therefore recognizes, that despite their widespread availability, parental control features are not always used because parents either do not know they exist or do not want to take the time to learn how to use them.

In another exemplary embodiment, a user sets parental control restrictions to block selected programs or other media content. When a child or anyone else subsequently requests to view a media content, the parental control restrictions are consulted to determine if the requested media content should be blocked. If the media content has not been blocked, the commercials scheduled to be displayed with the media content are analyzed. If the scheduled commercials are previews or promotions for any of the blocked media content, the commercials are also blocked. For example, if a user sets a parental control restriction to block the program "CSI: NY," commercials containing promotions or previews of this program are also blocked. This embodiment is helpful to users who are primarily concerned with the display of inappropriate promotions and previews during children's programming. Such previews and promotions are automatically blocked when a parent or other user elects to block the programs themselves.

These and other embodiments of the invention may be at least partially implemented with an interactive media guidance application. An interactive media guidance application allows a user to more easily navigate through the wide array of media content accessible by a typical user equipment device by displaying media content listings. The media content listings may be television program listings and may list the titles of television programs, their broadcast times, and other relevant information. A user may select to view the media content described by a listing by highlighting the media content listing and pressing an "Enter" or "Select" button on a remote control device or other input device. The media guidance application then tunes a receiver to the appropriate channel. An interactive media guidance application may also perform one of several media guidance application functions on content accessible by a user equipment device. These media guidance application functions may include searching for desired content, scheduling a selected content to be recorded, recording the selected content to a local storage device or remote media server, adding the selected content to a favorite programs list, setting a reminder for the selected content, ordering the selected content via an on-demand (e.g., video on-demand or VOD) or pay-per-view (PPV) service, or any other suitable function.

These and other important aspects of the present invention are described more fully in the detailed description below.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 1:
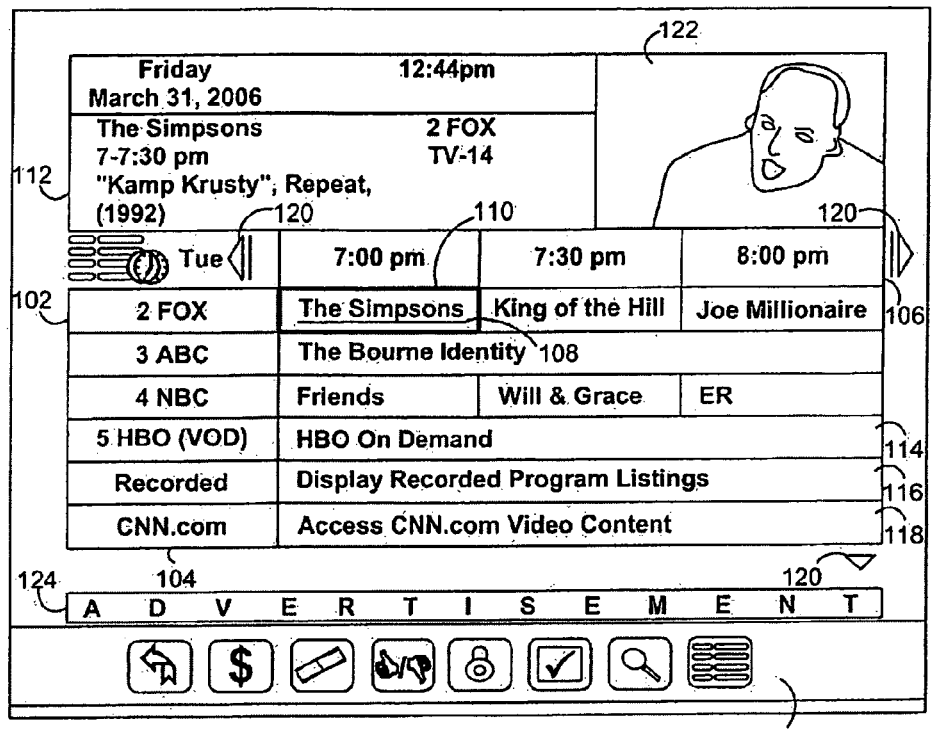
FIG. 1 shows an illustrative display screen that may be used to provide media guidance application listings in accordance with an embodiment of the invention.
Figure 2:
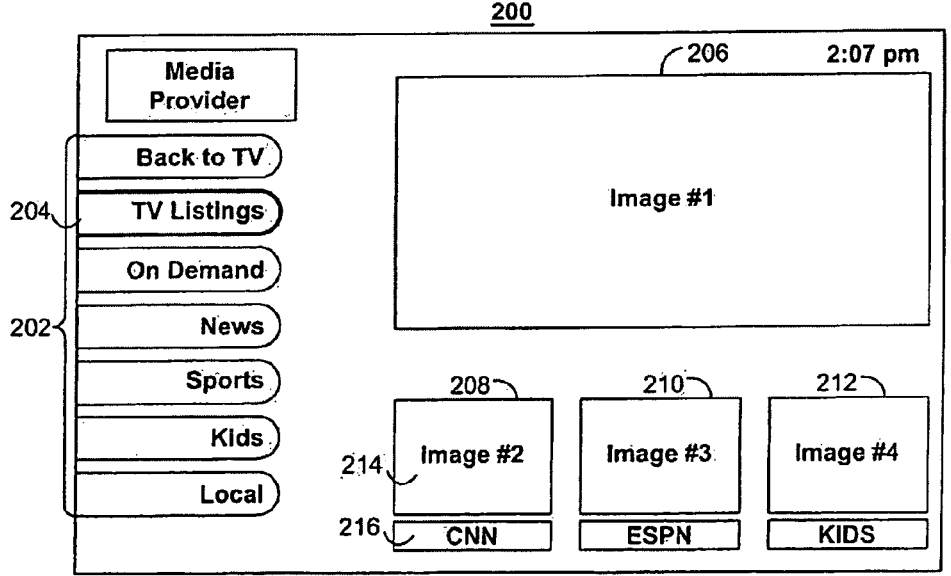
FIG. 2 shows another illustrative display screen that may be used to provide media guidance application listings in accordance with an embodiment of the invention.

One of the functions of the media guidance application is to provide media listings and media information to users. FIGS. 1-2 show illustrative display screens that may be used to provide media guidance, and in particular media listings. The display screens shown in FIGS. 1-2 and FIGS. 5-11 may be implemented on any suitable device or platform. The displays of FIGS. 1-2 and FIGS. 5-11 may be full screen displays or may be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Another function of the media guidance application is to provide a parental control mode that permits parents and other users to block objectionable media content, commercials, and even entire channels. Various systems and methods for blocking television programming are described in U.S. Pat. No. 7,047,547, which is hereby incorporated by reference herein in its entirety. Embodiments of novel parental control methods and systems in accordance with the present invention are described in more detail below.

Users may access media content and the media guidance application (and its display screens described above and below) from one or more of their user equipment devices. The user equipment devices may be personal computers, televisions, or any other devices. For example, one user equipment device may be a personal computer provided with a tuner card that allows TV signals to be displayed on the computer monitor. The user equipment device may also be television equipment with a set-top box or receiver that permits access to the Internet via a cable connection phone line, or other communication line.

Figure 3:
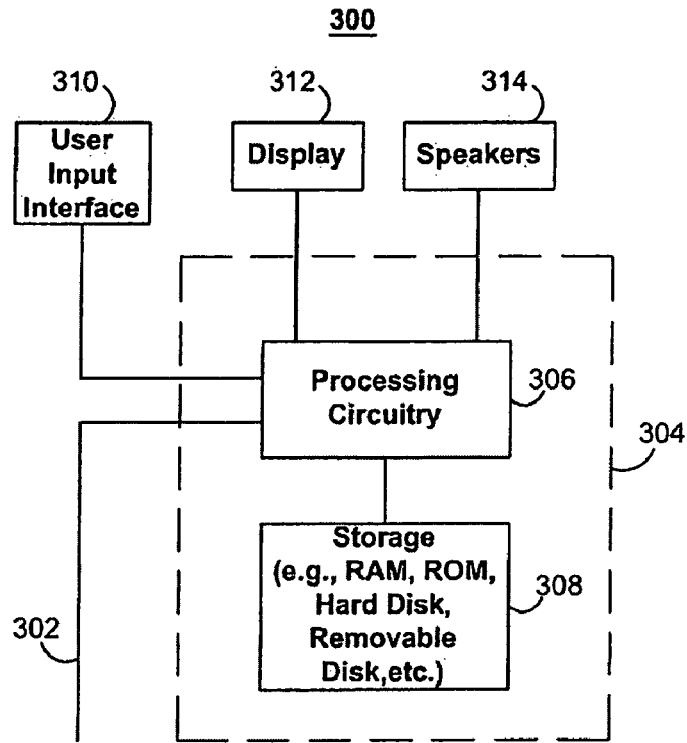
FIG. 3 shows an illustrative user equipment device in accordance with an embodiment of the invention.

FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
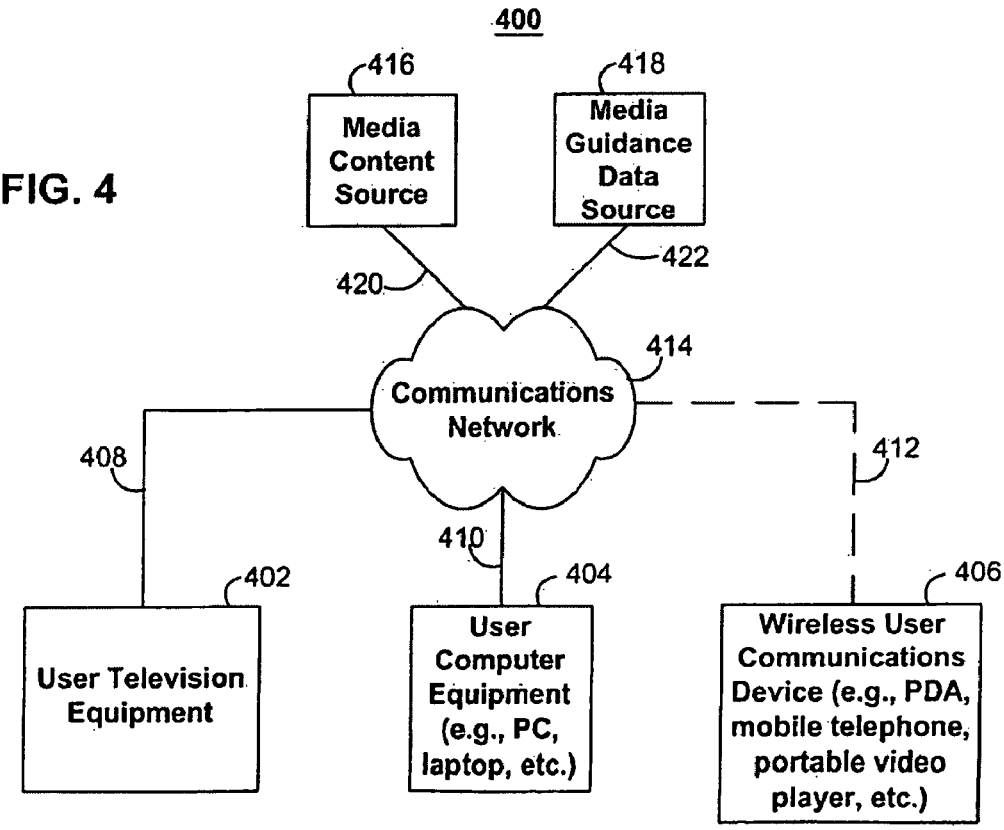
FIG. 4 is a diagram of an illustrative interactive media system in accordance with an embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a trademark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one or two source devices. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data and other guidance data may be provided to the user equipment on a television channel sideband, in the vertical blanking interval of a television channel, using an in-band digital signal, using an out-of-band digital signal, or by any other suitable data transmission technique.

Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user equipment device 300 may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user equipment device 300 directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

The above-described media guidance application, user equipment device 300, system 400, or similar devices and equipment may be used to implement systems and methods for blocking inappropriate or undesired commercials displayed during the broadcast or other showings of media content. The blocked commercials may include sponsor advertisements, previews or promotions for upcoming media content, or any other type of advertising.

To implement embodiments of the invention, commercials may be reviewed and assigned ratings the same or similar to the TV Parental Guideline ratings for TV programs. The ratings may include, for example, the following categories: TV-Y (All Children), TV-Y7 (Directed to Older Children), TV-Y7-FV (Directed to Older Children and Fantasy Violence), TV-G (General Audience), TV-PG (Parental Guidance Suggested), TV-14 (Parents Strongly Cautioned), and TV-MA (Mature Audiences Only). Metadata including one or more flags identifying a commercial's rating may then be embedded or inserted into media guidance application data for the commercial or for the media content during which the commercial is to be displayed.

The metadata may also describe attributes of a commercial other than its rating. For example, the metadata may identify a category or type of commercial (e.g. sponsor advertisement, promotion or premiere for a program), a commercial's sponsor (e.g. a particular company or brand), or even a commercial's content (e.g. beer commercial, candy commercial, etc.)

The media guidance application data, including the metadata describing the ratings or other attributes for the commercials, are then sent to the user equipment device 300. The user equipment device 300 receives the media guidance application data, parses the data for the commercials' rating or attribute metadata, and then determines if the commercials can be displayed in accordance with one or more of the embodiments discussed below.

Instead of gleaning a commercial's rating or content from metadata, such information can be ascertained by analyzing closed captioning data, audio components, or even video components, of a commercial as described below.

In one exemplary embodiment, a user is first provided with the ability to set parental control restrictions for media content and commercials. For example, the user may access a parental control mode provided by a media guidance application implemented with a set-top box and choose to block all media content and commercials with a rating of TV-Y7 or higher. Alternatively, the user may choose to block commercials with a particular content, such as alcohol commercials, or all previews/promotions. When a child (or anyone else) requests to view a media content, the media content and commercials scheduled to be displayed with the media content are compared to the parental control restrictions. If they violate the restrictions, they are blocked. The blocked commercials may be replaced with more suitable commercials, a blank screen, music, a program trailer, a cartoon, graphics, a still-photo, or any other replacement media. Because both the media content and the commercials are compared to the parental control restrictions, the media content may be displayed even if the commercials are blocked.

In another exemplary embodiment, a rating of a media content and a rating of a commercial scheduled to be displayed during the media content are received and compared. For example, media guidance application data for a media content may be received at a set-top box and parsed to find the ratings of the media content itself and the ratings of the commercials scheduled to be displayed with the media content. The ratings are then compared. If the rating of any commercial is higher than the media content rating, display of that commercial is blocked. This embodiment permits the automatic blocking of commercials without requiring a user to first set parental control restrictions.

In another exemplary embodiment, a user sets parental control restrictions to block selected programs or other media content. When a child or anyone else subsequently requests to view a media content, the parental control restrictions are consulted to determine if the requested media content should be blocked. If the media content has not been blocked, the commercials scheduled to be displayed with the media content are analyzed. If the scheduled commercials are previews or promotions for any of the blocked media content, the commercials are also blocked. For example, if a user blocks display of the programs "Sex and the City" and "American Idol," promotions or previews of these programs will also be blocked. This embodiment is helpful to users who are primarily concerned with the display of inappropriate promotions and previews during children's programming. Such previews and promotions are automatically blocked when a parent or other user elects to block the programs themselves.

These and other embodiments of the invention may be at least partially implemented with the user equipment device 300, system 400, and interactive media guidance application described above.

Figure 5:
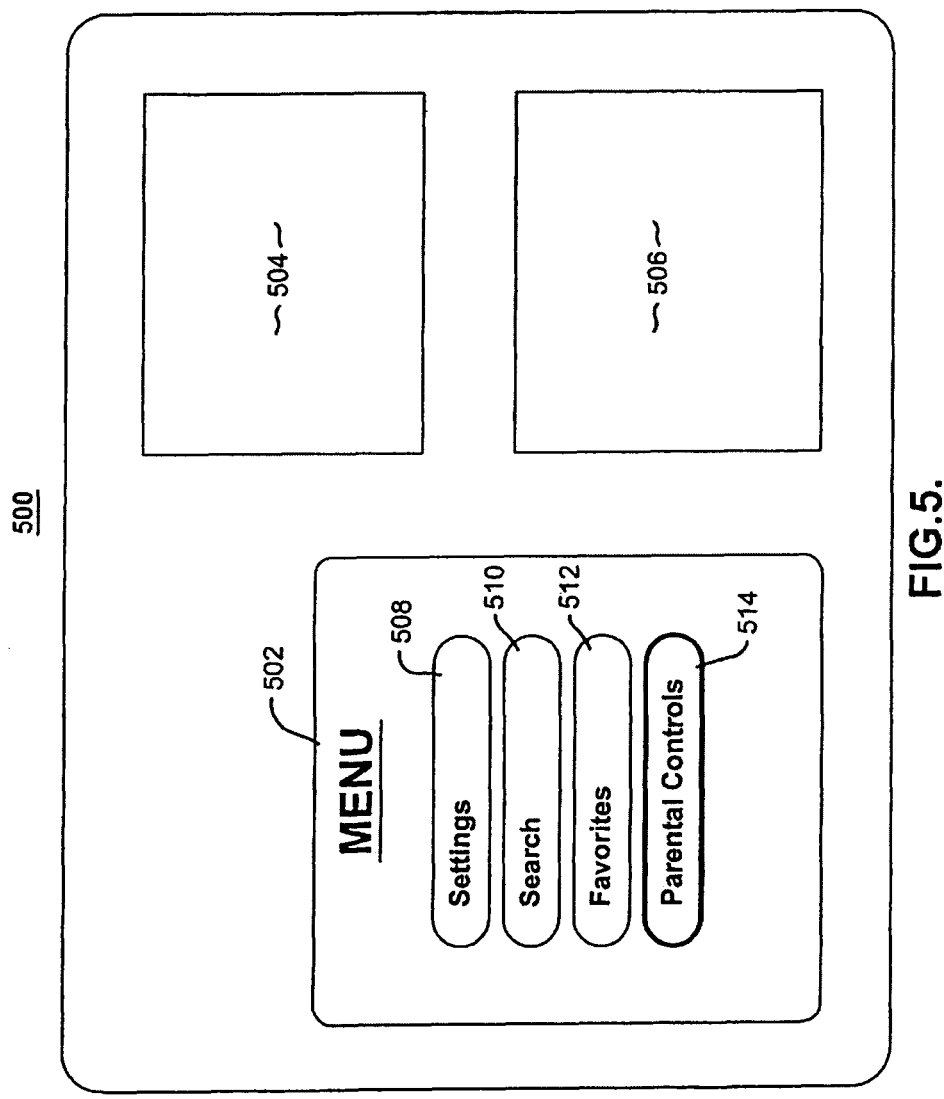
FIG. 5 shows an illustrative display screen that may be used to select a parental control mode of a media guidance application.
Figure 6:
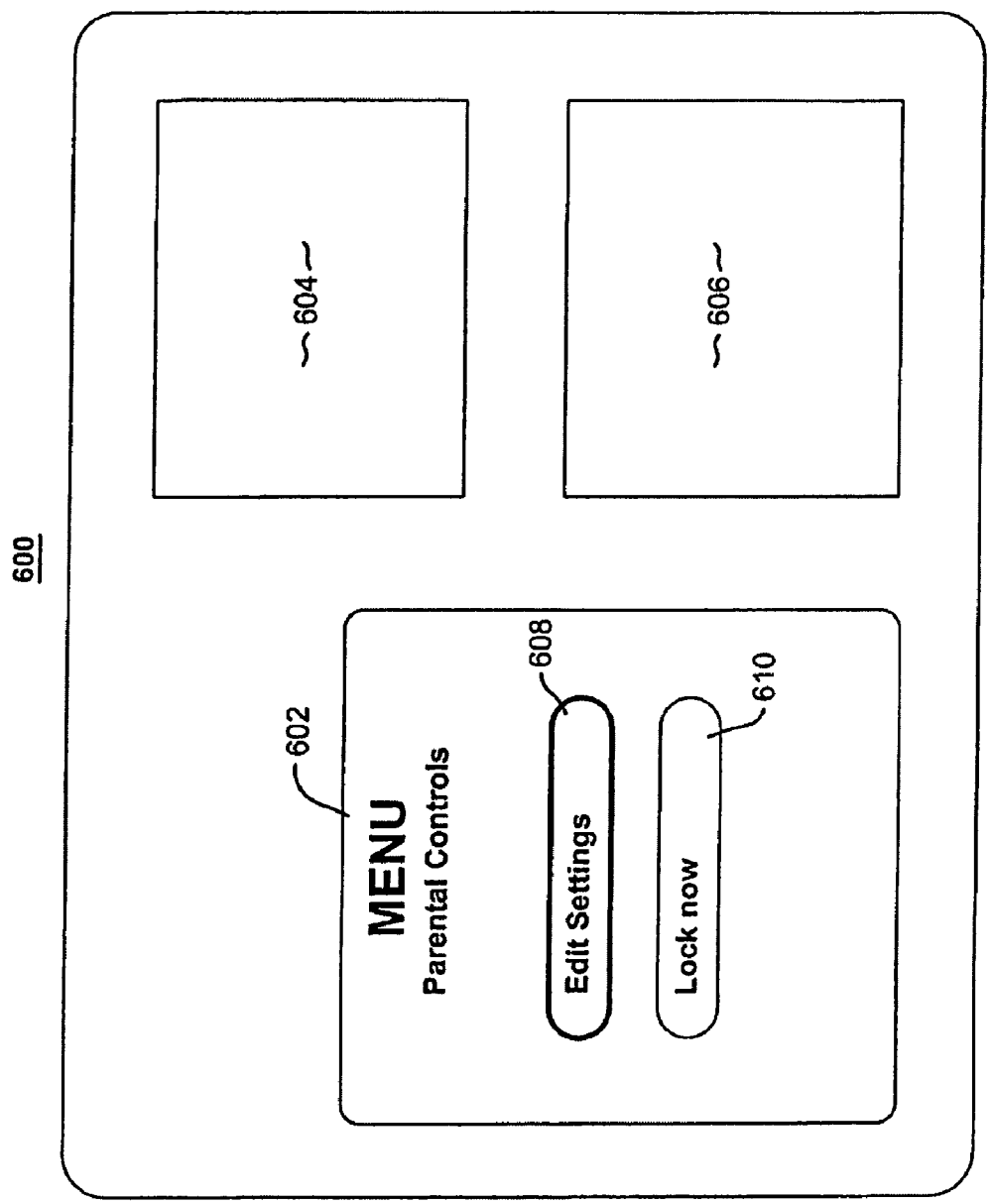
FIG. 6 shows an illustrative display screen that may be used to select functions in a parental control mode.

FIG. 5 illustrates an exemplary menu display screen 500 that may be used to access a parental control mode provided by the media guidance application. The display screen 500 may be displayed whenever a user presses a Menu button or other button on the user input interface 310 or other control device. The display screen 500 may include a Menu region 502 for displaying menu options, a Media Content region 504 for displaying TV programs or other media content, and an Advertising region 506 for displaying advertisements. The Menu region 502 may include selections for Settings 508, Search 510, Favorites 512, Parental Controls 514, and possibly other menu categories. A user may navigate between any of these selections with the user input interface 310. For example, the user may press the arrows or other buttons on the user input interface 310 to move a highlight or bold region (which is shown on the Parental Controls selection 514) about the display screen 500 and may then press an Enter button or similar button to enable the highlighted selection.

After selecting the Parental Controls selection 514 in FIG. 5, the user may be presented with a listing of parental control options. For example, an exemplary menu screen 600 shown in FIG. 6 may be displayed. Menu screen 600 may include a Menu region 602 for displaying menu options, a Media Content region 604 for displaying TV programs or other media content, and an Advertising region 606 for displaying advertisements. The Menu region 602 may include selections for Edit Settings 608, Lock Now 610, and possibly other categories. Again, a user may navigate between the selections and pick one by placing a highlight region over the requested selection and pressing Enter or another button on the user input interface 310.

After selecting the Edit Settings selection 608 from menu screen 600, the user may be presented with a listing of particular parental control settings. For example, an exemplary display screen 700 such as the one illustrated in FIG. 7 may be displayed. Display screen 700 may include a Parental Control Category region 702 and a Parental Control Settings region 704. The Parental Control Category region 702 may include selections for Ratings Block 706, Program Block 708, Channel Block 710, Spending Block 712, Hours Block 714, and Done 716.

The Ratings Block selection 706 allows for the blocking of selected media content based on ratings as discussed in more detail below. The Program Block selection 708 allows for the blocking of particular programs or other media content independent of their ratings. The Channel Block selection 710 allows for the blocking of entire channels. The Spending Block selection 712 allows for the entry of a spending limit (e.g. $10, $50, etc.) for pay-per-view movies and other paid-for media content. The Hours Block selection 714 allows for the blocking of media content broadcast or otherwise displayed during particular hours (e.g. 12:00 AM to 8:00 AM). The Done selection 716 simply exits the display screen 700.

Figure 7:
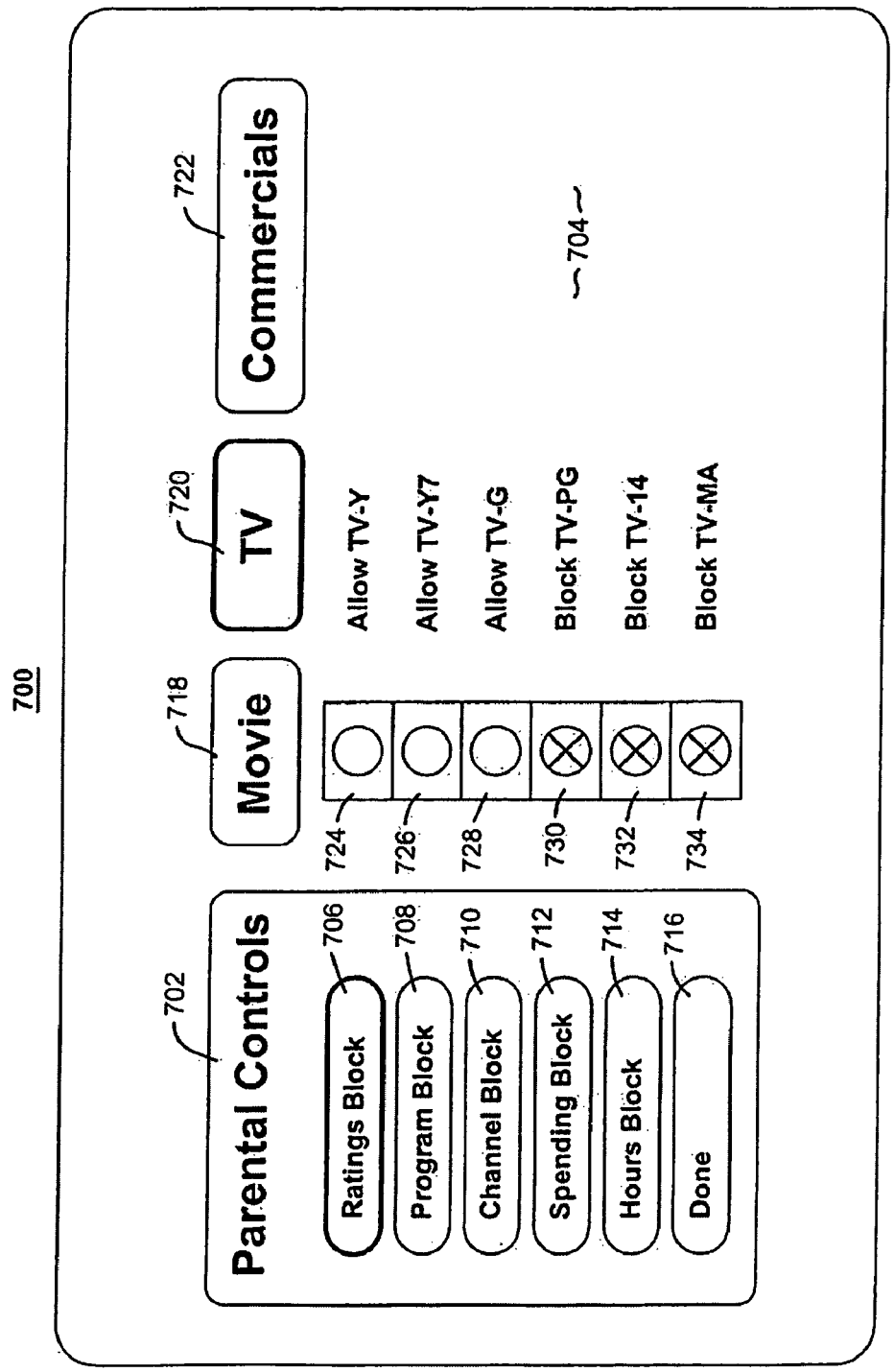
FIG. 7 shows another illustrative display screen that may be used to select functions in a parental control mode.
Figure 8:
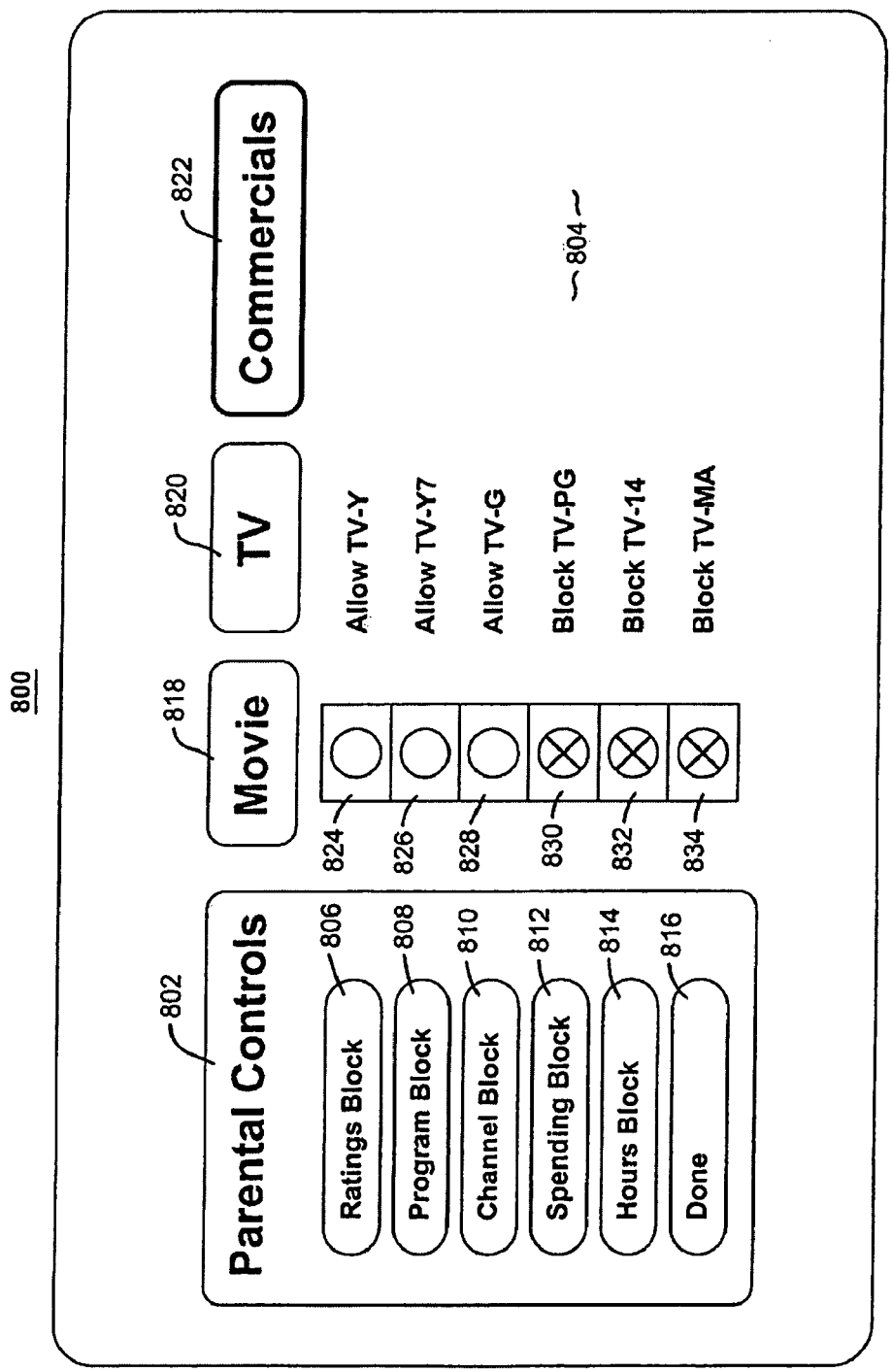
FIG. 8 shows yet another illustrative display screen that may be used to select functions in a parental control mode.

The information displayed in the Parental Control Settings region 704 depends upon which selection is chosen in the Parental Control Category region 702. For example, if the Ratings Block selection 706 is chosen as shown in FIG. 7, the Parental Control Settings region 704 may include several boxes, buttons, and other selectable items that permit a user to block particular media content based on ratings. Specifically, region 704 may include a Movie selection box 718, a TV selection box 720, and a Commercials selection box 722. The Movie selection box 718 permits the blocking of selected movies, the TV selection box 720 permits the blocking of selected TV programs, and the Commercials selection box 722 permits the blocking of selected commercials. A user may navigate between these boxes as discussed above and select one by highlighting it and pressing Enter on the user input interface 310.

The Parental Control Settings region 704 displayed when the Ratings Block selection 706 is chosen may also include a number of selectable boxes that indicate the allowed ratings for particular movies, TV programs, or commercials. The selectable boxes may include a box 724 for allowing or blocking TV-Y rated media content, a box 726 for allowing or blocking TV-Y7 rated media content, a box 728 for allowing or blocking TV-G rated media content, a box 730 for allowing or blocking TV-PG rated media content, a box 732 for allowing or blocking TV-14 rated media content, and a box 734 for allowing or blocking TV-MA rated media content.

To enter ratings-based parental restrictions in display screen 700, a user selects the Ratings Block selection 706, then either the Movie selection box 718, TV selection box 720, or Commercials selection box 722, and then checks or otherwise selects the boxes 724-734 to pick either "allow" or "block." For example, display screen 700 indicates that a user has decided to allow all TV programming with a TV-Y, TV-Y7, or TV-G rating, and to block all TV programs with higher ratings.

If the user selects the Commercials selection box 722 in FIG. 7, a screen that permits the user to set ratings-based blocks for commercials may be displayed. For example, a display screen 800 such as the one shown in FIG. 8 may be displayed. Display screen 800 is similar to display screen 700 except that it permits the user to enter ratings-based parental restrictions for commercials instead of TV programs. Display screen 800 indicates that a user has decided to allow all commercials with a TV-Y, TV-Y7, or TV-G rating, and to block all commercials with higher ratings.

Commercials may also be blocked by criteria other than their ratings. For example, commercials may be blocked based on their categories (e.g. all promotions or premieres may be blocked), their sponsor (e.g. all commercials of a particular company or type of company may be blocked), or their content (e.g. all commercials for candy, cookies, etc. may be blocked).

Commercials may also be blocked according to keywords entered by a parent or other person. For example, all commercials with text or audio referencing the keywords "beer," "liquor," "alcohol," "wine," etc. may be blocked. Parents or other users may enter the keywords with the assistance of the media guidance application or may choose keywords from a list of keywords.

Figure 9:
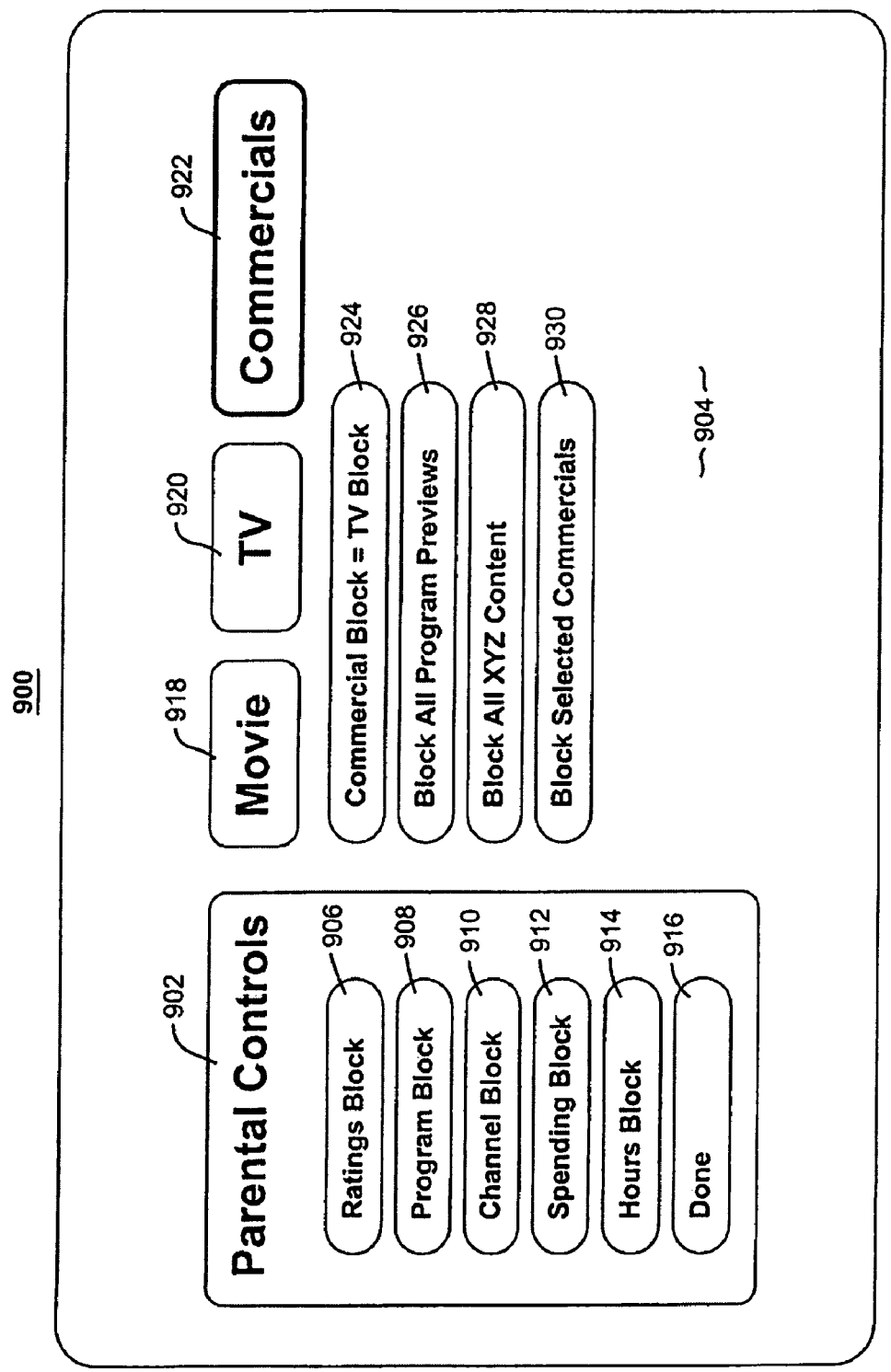
FIG. 9 shows yet another illustrative display screen that may be used to select functions in a parental control mode.

FIG. 9 illustrates another exemplary display screen 900 for blocking commercials. Display screen 900 may be displayed instead of display screen 800 when the Commercials selection box 722 or 822 is chosen. In addition to selections 906-922, which are essentially the same as selections 806-822 of display screen 800, display screen 900 may also include a selection box 924 that automatically sets the commercials block to be the same as the TV block. For example, if the user selects to block all TV-PG and higher TV programs with display screen 700, selection box 924 will automatically block all TV-PG and higher rated commercials. This allows a user to quickly and easily set commercial blocks that mirror TV blocks.

Display screen 900 may also include a selection box 926 that blocks all premieres, previews, etc. for media content. This feature may be used to block premieres, etc. even if no other parental restrictions, such as ratings-based restrictions, are set.

Display screen 900 may also include selection box 928 that blocks all commercials with a particular content (e.g. liquor or candy commercials). Again, this feature may be used to block certain commercials even if no other parental restrictions are set.

The content of commercials may be ascertained by analyzing closed captioning data. Most television programs and commercials are broadcast with closed captioning data so that speech in the programs and commercials can be reproduced as text. Embodiments of the invention compare this closed captioning data to parental control restrictions to block commercials with objectionable content. For example, a parent or other user may set a parental control restriction to block all commercials relating to alcohol. During display of a media content and commercials, the user equipment 300 analyzes closed captioning data in real-time, or near real-time, and searches for prohibited words such as alcohol, beer, wine, vodka, Budweiser, Miller, Coors, etc. If any prohibited word is discovered in a commercial's closed captioning data, the user equipment blocks further display of the commercial.

Similarly, related embodiments may analyze the audio components of a commercial in real-time or near real-time in an attempt to detect prohibited spoken words or other prohibited audio. For example, speech or audio recognition software may monitor a commercial in an attempt to identify the spoken words "beer" or "alcohol." Other embodiments may perform visual recognition techniques to identify prohibited images such as alcohol bottles or nudity. If any prohibited words or images are detected, the user equipment blocks further display of the commercial.

The display screen 900 may even include a selection box 930 that allows a user to block individually selected commercials. Selection box 930 may be linked to another display screen that lists all known commercials by title or by some other identifier. A user may then select particular commercials from the list to block. Alternatively, selection box 930 may permit the user to type in the names of particular commercials to block.

Figure 10:
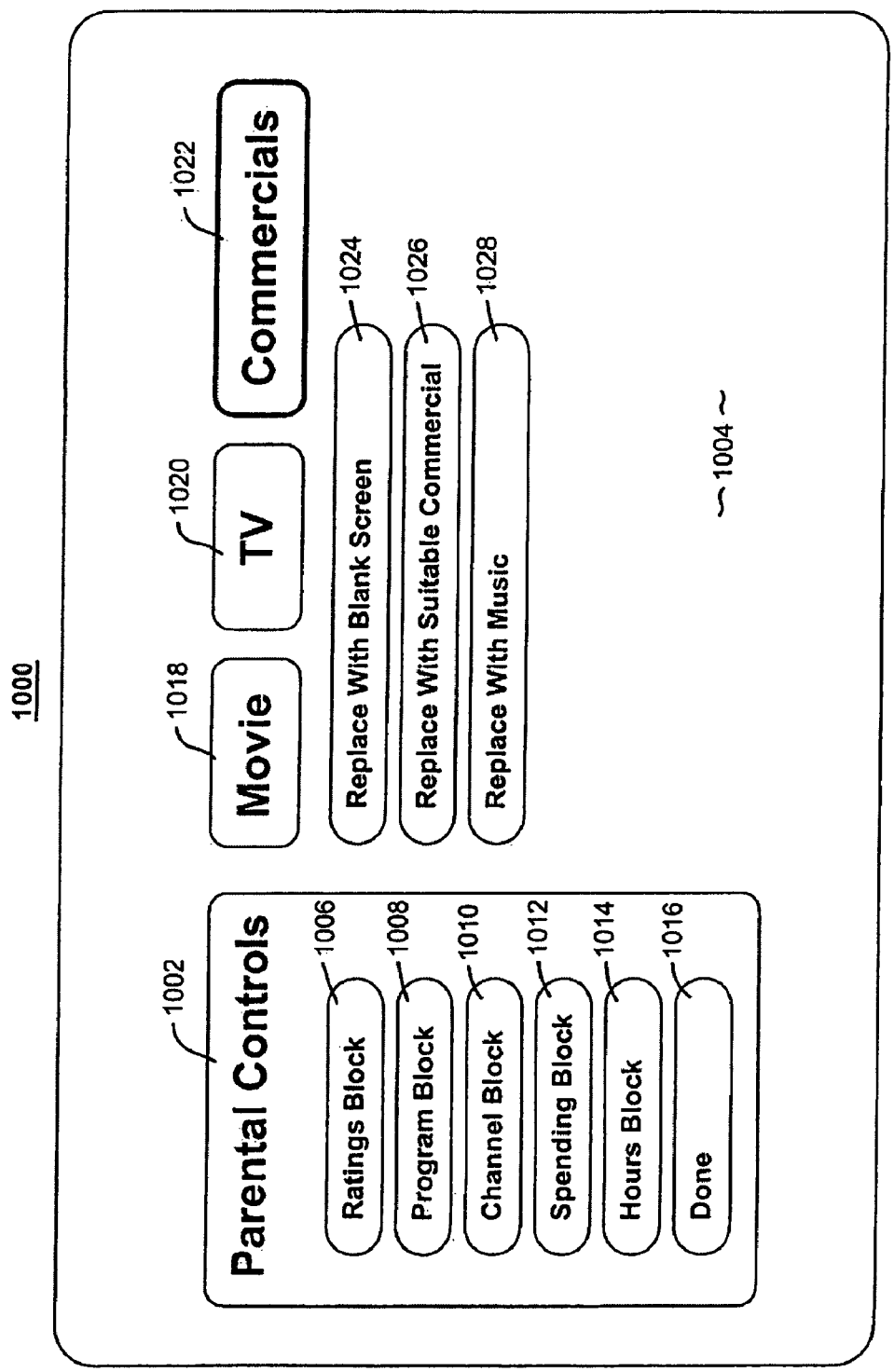
FIG. 10 shows yet another illustrative display screen that may be used to select functions in a parental control mode.
Figure 11:
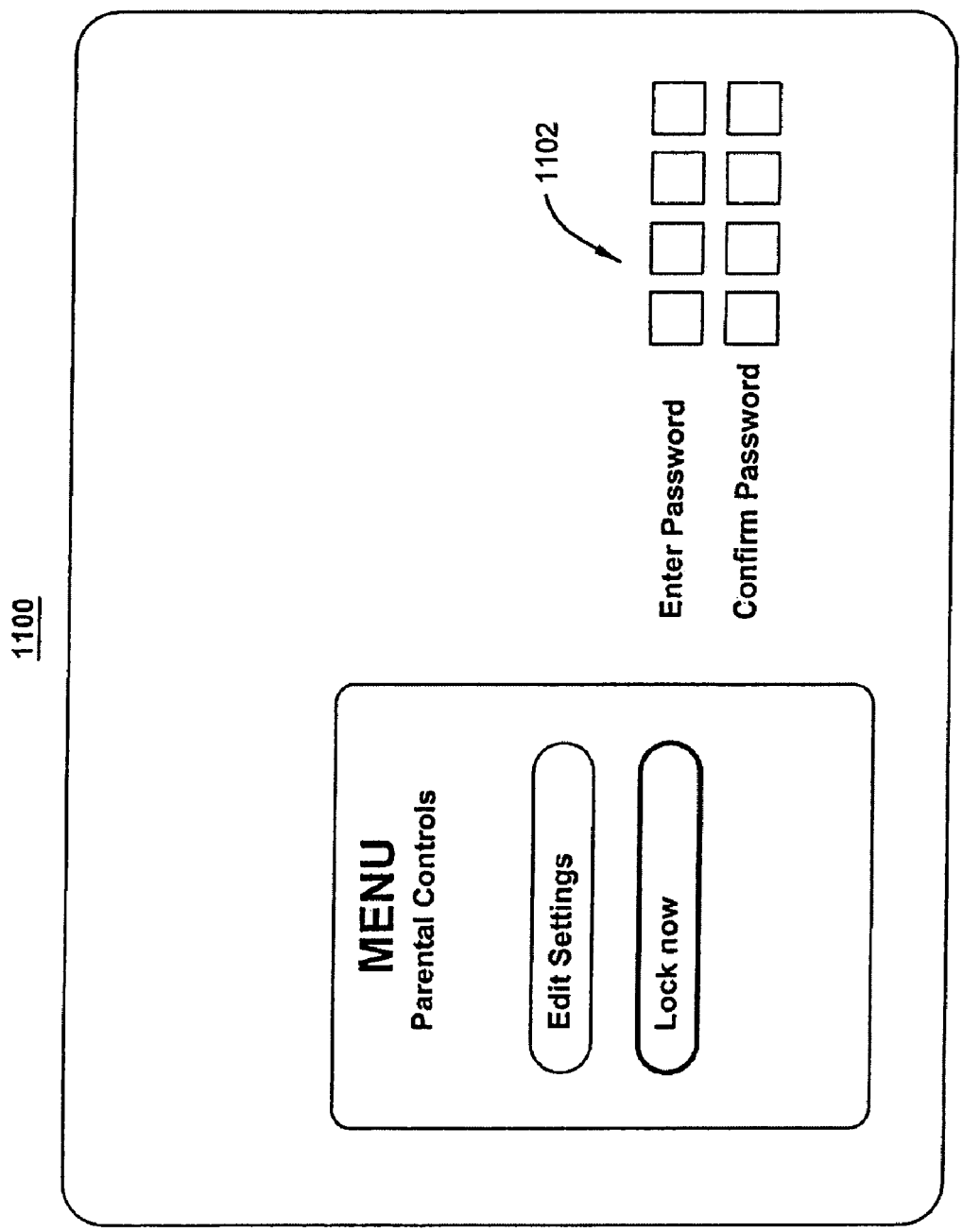
FIG. 11 shows an illustrative display screen that may be used to activate selected functions of a parental control mode.

FIG. 10 illustrates an exemplary display screen 1000 that permits a user to choose how to replace blocked commercials. In addition to selections 1006-1022, which are essentially the same as selections 806-822 of display screen 800, display screen 1000 may include a selection box 1024 that replaces blocked commercials with a blank screen, a selection box 1026 that replaces blocked commercials with more suitable commercials (e.g. commercials with ratings equal to or lower than the rating of the currently displayed media content, and a selection box 1028 that replaces blocked commercials with music or any other selected replacement media.

Once parental restrictions have been entered as described above, the user may save them or edit them by entering a passcode. For example, a display screen 1100 such as the one shown in FIG. 11 may be displayed. A user may enter and re-enter a passcode or other password or ID in the boxes 1102 in a conventional manner with the user input interface 310. The entered parental control restrictions may then be consulted whenever a user requests to view a media content as discussed herein to determine whether commercials accompanying the media content should be blocked.

Figure 12:
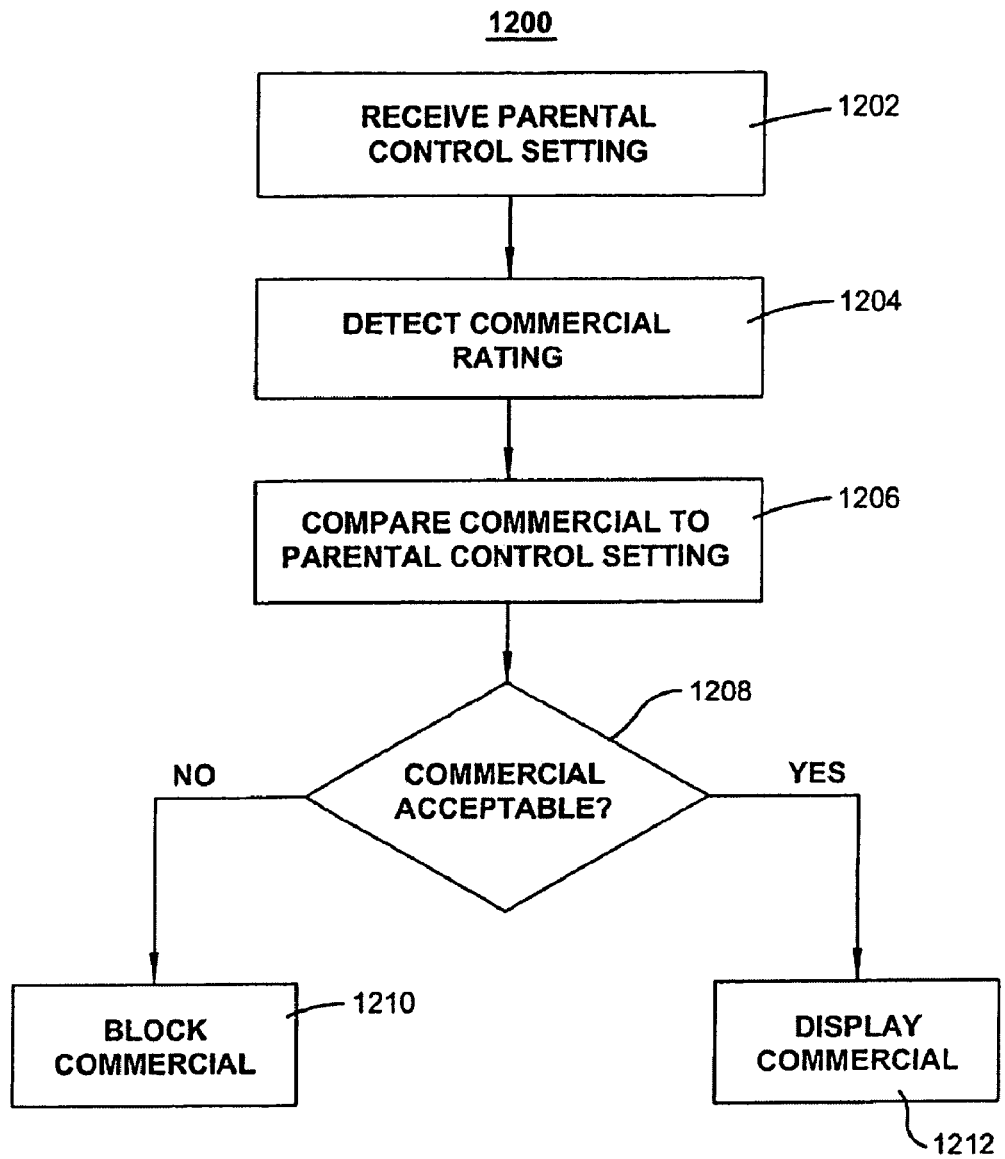
FIG. 12 shows an illustrative process for blocking commercials in accordance with an embodiment of the invention.

FIG. 12 shows an exemplary process 1200 for blocking selected commercials using some of the display screens and other techniques described above. In step 1202, parental control restrictions are received. The parental control restrictions may be received by a set-top box of the user equipment device 300 and may be entered with the display screens 500, 600, 700, 800, 900, and 1000 of FIGS. 5-10.

In step 1204, the rating of a commercial is detected. A commercial's rating may be provided in metadata accompanying media application data sent to the user equipment as described above or detected by any other suitable means or methods.

In step 1206, the commercial's rating is compared to the parental control restrictions received in step 1202. Step 1208 then determines if the commercial should be blocked based on step 1206. For example, if step 1206 determines that the commercial's rating is TV-G or higher, but the parental control restrictions restrict commercials with a rating of TV-Y7 or higher, step 1208 marks or otherwise identifies the commercial as unacceptable. When it comes time to display the commercial, step 1210 blocks it and replaces it with a blank screen, an acceptable commercial, music, or any other replacement media. If, however, step 1206 determines that the commercial's rating is equal to or lower than the parental control restrictions, step 1208 marks or otherwise identifies the commercial as acceptable and allows it to be displayed in step 1212. Process 1200 may also block commercials based on attributes other than ratings. For example, the parental restrictions received in step 1202 may relate to the content of commercials, the sponsors of commercials, or the types of commercials as discussed above.

Figure 13:
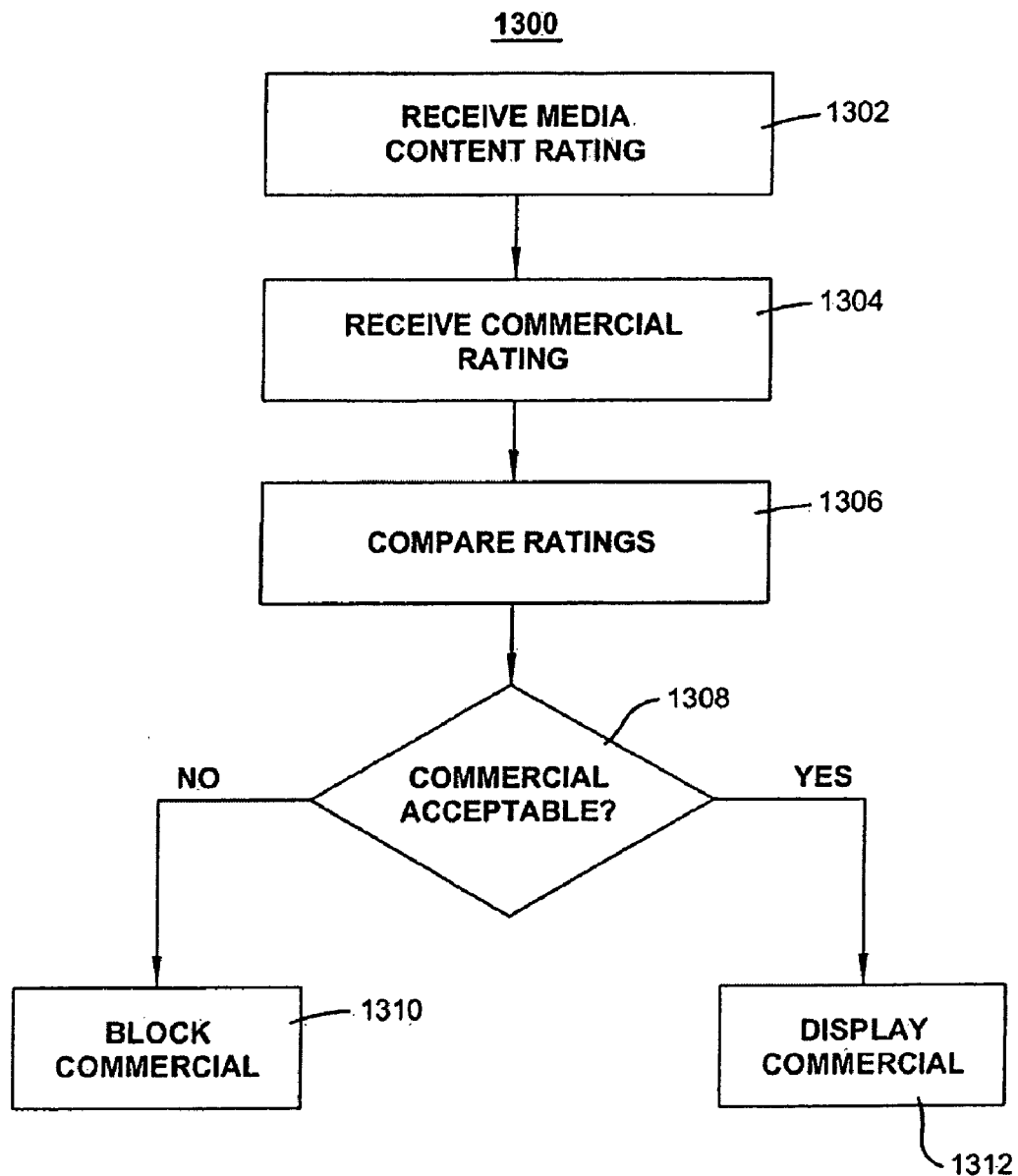
FIG. 13 shows an illustrative process for blocking commercials in accordance with another embodiment of the invention.

FIG. 13 shows another exemplary process 1300 for blocking selected commercials. In step 1302, the rating of a media content is detected. A media content's rating may be provided in metadata accompanying the media guidance application data sent to the user equipment.

In step 1304, the rating of a commercial to be displayed along with the media content is detected. A commercial's rating may be provided in metadata accompanying media application data for the commercial or for the related media content or may be detected by any other suitable means or methods.

In step 1306, the commercial's rating is compared to the media content's rating. Step 1308 then determines if the commercial should be blocked based on step 1306. For example, if step 1306 determines that the commercial's rating is higher than the media content's rating, step 1308 marks or otherwise identifies the commercial as unacceptable. Step 1310 then blocks the commercial and replaces it with a blank screen, an acceptable commercial, music, or other replacement media. If, however, step 1306 determines that the commercial's rating is equal to or lower than the media content's rating, step 1308 marks or otherwise identifies the commercial as acceptable and allows it to be displayed in step 1312.

Figure 14:
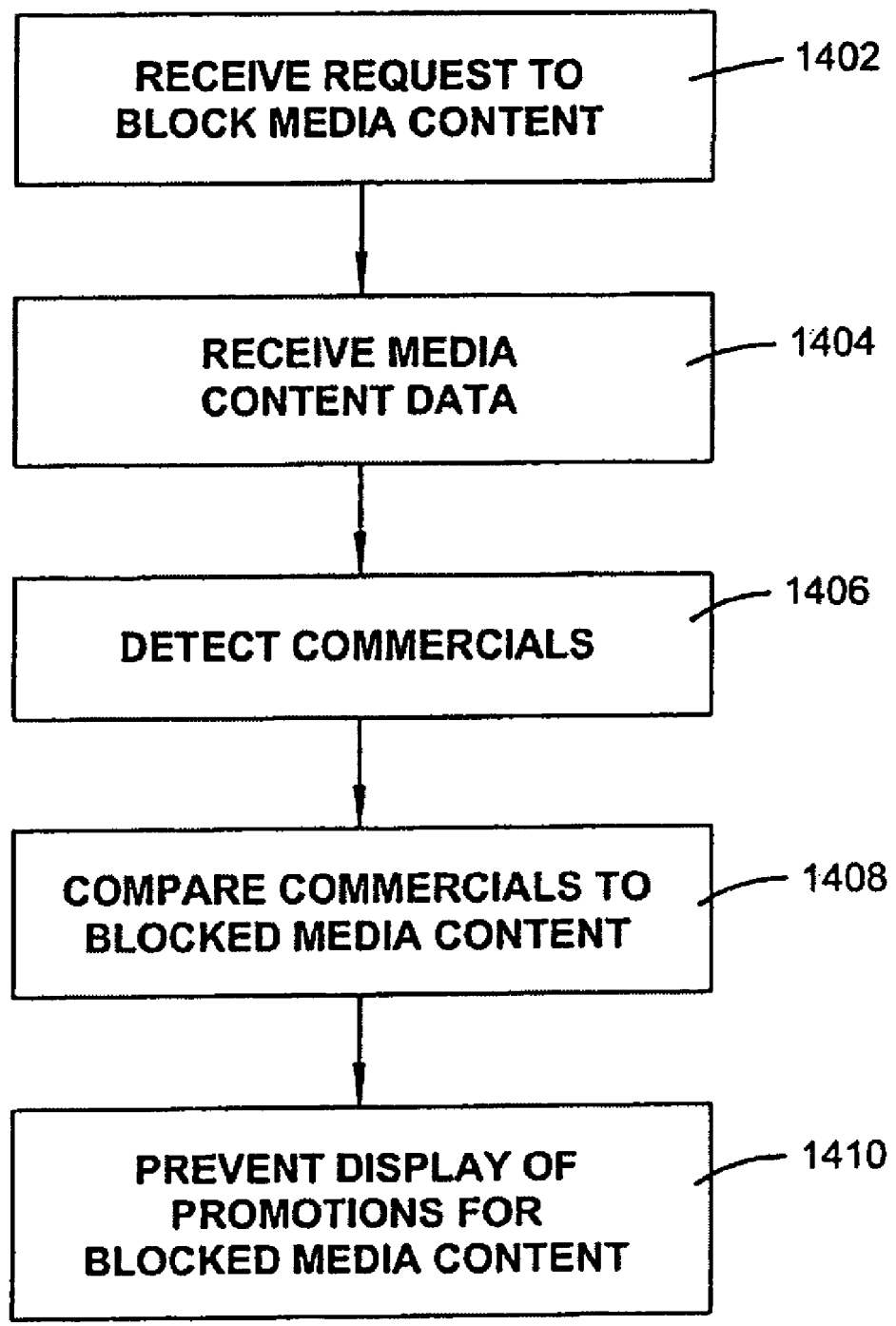
FIG. 14 shows an illustrative process for blocking commercials in accordance with yet another embodiment of the invention.

FIG. 14 shows another exemplary process 1400 for blocking selected commercials. In step 1402, a request to block particular media content is received. A user may elect to block particular media content such as TV programs by displaying a media content listing with the media guidance application. The media content listing may be a television program listing 108 such as the one shown in FIG. 1 and may list the title of the television program, its broadcast time, and other relevant information. A user may select to block a media content by highlighting a corresponding listing and pressing a Block button or similar button on a remote control device or other input device. Alternatively, the user may select the Program Block selection 708 from display 700 and then pick particular programs to block.

In step 1404, media application data is received by the user equipment device 300. Step 1406 then detects the type or category of commercials scheduled to be displayed with the media content by parsing the media application data.

Step 1408 then compares the identified commercials to the list of blocked media content to determine if any of the commercials are promotions or premieres for the any of the blocked media content.

Step 1410 then prevents the display of such promotions or premieres for blocked media content and replaces them with more suitable commercials, blank screens, etc. Users also may customize the level of blocking in various degrees; for example, a user may choose to "always block commercials promoting restricted content", or "allow viewing of commercials promoting blocked content, only if the rating of the commercial is not restricted", etc.

The parental control restrictions for commercials, TV programs, movies, and other media content may be disabled upon entry of a legitimate passcode. For example, each time a user attempts to display a prohibited media content, the display screen 1100 shown in FIG. 11 may be presented. If the user enters a valid passcode, the media guidance application then tunes a receiver or other component on the user equipment device 300 to the appropriate channel to display the media content.

Although the invention has been described with reference to preferred embodiments illustrated and discussed herein, equivalents may be employed and substitutions made herein without departing from the scope of the invention as recited in the claims. For example, it will be appreciated that while the discussion of media content has focused on video content such as television programs, the principles of the present invention can be applied to other types of media content, such as music, images, etc. Similarly, the display screens 500, 600, 700, 800, 900, 1000, and 1100 shown in FIGS. 5-11 are merely illustrative and may be replaced with any suitable display screen arrangement. For example, instead of being displayed on dedicated screens, the various menu options may be displayed as opaque or translucent overlays over displayed media content.

Having thus described the preferred embodiment of the invention, what is claimed as new and desired to be protected by Letter Patent includes the following:

The invention claimed is:

1. A method for blocking selected commercials during display of video content, the method comprising:
   receiving user input setting parental control restrictions for video content and commercials, wherein the parental control restrictions include one or more user specified keywords associated with the commercials;
   retrieving, from a memory, one or more additional keywords based on the one or more user specified keywords, wherein the additional keywords are contextually related to the user specified keywords;
   detecting when a commercial to be displayed with the video content violates the parental control restrictions based at least in part on the one or more user specified keywords and the one or more additional keywords; and
   preventing display of the commercial if it violates the parental control restrictions while permitting display of the video content if it does not also violate the parental control restrictions.

2. The method as set forth in claim 1, wherein the preventing step includes the step of replacing the commercial with another commercial that does not violate the parental control restrictions.

3. The method as set forth in claim 1, wherein the preventing step includes the step of replacing the commercial with a blank screen.

4. The method as set forth in claim 1, wherein the detecting step includes the step of detecting a ratings identifier in the commercial and comparing the ratings identifier to ratings information included in the parental control restrictions.

5. The method as set forth in claim 1, wherein the detecting step includes the step of detecting a ratings identifier in media guidance application data for the commercial and comparing the ratings identifier to ratings information included in the parental control restrictions.

6. The method as set forth in claim 1, wherein the detecting step includes the step of detecting a content identifier in the commercial or in media guidance application data for the commercial and comparing the content identifier to a content identifier included in the parental control restrictions.

7. The method as set forth in claim 1, wherein the detecting step includes the step of analyzing closed captioning data for the commercial and comparing the closed captioning data to the parental control restrictions.

8. The method as set forth in claim 1, wherein the commercial is selected from the group consisting of an advertisement for a product, an advertisement for a service, and a promotion for an upcoming video content.

9. The method as set forth in claim 1, wherein the detecting and preventing steps include the steps of comparing a rating of the commercial to a rating of the video content and preventing display of the commercial if the commercial rating is higher than the video content rating.

10. The method as set forth in claim 1, wherein the detecting and preventing steps include the steps of comparing the commercial to a list of blocked video content and preventing display of the commercial if it is a promotion of a video content within the list of blocked video content.

11. The method as set forth in claim 1, wherein the receiving step includes the step of implementing a media guidance application on equipment of the user, the media guidance application including a parental control mode.

12. The method as set forth in claim 11, wherein the media guidance application is an interactive program guide.

13. The method as set forth in claim 1, wherein the violation of the parental control restrictions by the commercial is detected based at least in part on image recognition of at least one object to be displayed in the commercial.

14. The method as set forth in claim 1, wherein the one or more keywords include a title of one of the commercials.

15. A system for blocking selected commercials, the system comprising:
control circuitry operable to:
receive user input setting parental control restrictions for video content and commercials, wherein the parental control restrictions include one or more user specified keywords associated with the commercials;
retrieve, from a memory, one or more additional keywords based on the one or more user specified keywords, wherein the additional keywords are contextually related to the user specified keywords;
detect when a commercial to be displayed with a video content violates the parental control restrictions based at least in part on the one or more user specified keywords and the one or more additional keywords; and
prevent display of the commercial if it violates the parental control restrictions while permitting display of the video content if it does not also violate the parental control restrictions.

16. The system as set forth in claim 15, wherein the control circuitry is further operable to replace the commercial with another commercial that does not violate the parental control restrictions.

17. The system as set forth in claim 15, wherein the control circuitry is further operable to replace the commercial with a blank screen.

18. The system as set forth in claim 15, wherein the control circuitry is further operable to detect a ratings identifier in the commercial and compare the ratings identifier to ratings information included in the parental control restrictions.

19. The system as set forth in claim 15, wherein the control circuitry is further operable to detect a ratings identifier in media guidance application data for the commercial and compare the ratings identifier to ratings information included in the parental control restrictions.

20. The system as set forth in claim 15, wherein the control circuitry is further operable to detect a content identifier in the commercial or in media guidance application data for the commercial and compare the content identifier to a content identifier included in the parental control restrictions.

21. The system as set forth in claim 15, wherein the control circuitry is further operable to analyze closed captioning data for the commercial and to compare the closed captioning data to the parental control restrictions.

22. The system as set forth in claim 15, wherein the commercial is selected from the group consisting of an advertisement for a product, an advertisement for a service, and a promotion for an upcoming video content.

23. The system as set forth in claim 15, wherein the control circuitry is further operable to compare a rating of the commercial to a rating of the video content and prevent display of the commercial if the commercial rating is higher than the video content rating.

24. The system as set forth in claim 15, wherein the control circuitry is further operable to compare the commercial to a list of blocked video content and prevent display of the commercial if it is a promotion of a video content within the list of blocked video content.

25. The system as set forth in claim 15, wherein the control circuitry implements a media guidance application.

26. The system as set forth in claim 15, wherein the violation of the parental control restrictions by the commercial is detected based at least in part on image recognition of at least one object to be displayed in the commercial.

27. The system as set forth in claim 15, wherein the one or more keywords include a title of one of the commercials.

28. A system for blocking selected commercials during display of video content, the system comprising:
means for receiving user input setting parental control restrictions for video content and commercials, wherein the parental control restrictions include one or more user specified keywords associated with the commercials;
means for retrieving, from a memory, one or more additional keywords based on the one or more user specified keywords, wherein the additional keywords are contextually related to the user specified keywords;
means for detecting when a commercial to be displayed with the video content violates the parental control restrictions based at least in part on the one or more user specified keywords and the one or more additional keywords; and
means for preventing display of the commercial if it violates the parental control restrictions while permitting display of the video content if it does not also violate the parental control restrictions.

29. The system as set forth in claim 28, further including means for replacing the commercial with another commercial that does not violate the parental control restrictions.

30. The system as set forth in claim 28, further including means for replacing the commercial with a blank screen.

31. The system as set forth in claim 28, further including means for detecting a ratings identifier in the commercial and comparing the ratings identifier to rating information included in the parental control restrictions.

32. The system as set forth in claim 28, further including means for detecting a ratings identifier in media guidance application data for the commercial and comparing the ratings identifier to rating information included in the parental control restrictions.

33. The system as set forth in claim 28, further including means for detecting a content identifier in the commercial or in media guidance application data for the commercial and comparing the content identifier to a content identifier included in the parental control restrictions.

34. The system as set forth in claim 28, further including means for comparing a rating of the commercial to a rating of the video content and preventing display of the commercial if the commercial rating is higher than the video content rating.

35. The system as set forth in claim 28, further including means for comparing the commercial to a list of blocked video content and preventing display of the commercial if it is a promotion of a video content within the list of blocked video content.

36. The system as set forth in claim 28, further including means for analyzing closed captioning data for the commercial and comparing the closed captioning data to the parental control restrictions.

37. The system as set forth in claim 28, wherein the commercial is selected from the group consisting of an advertisement for a product, an advertisement for a service, and a promotion for an upcoming video content.

38. The system as set forth in claim 28, wherein the means for receiving includes means for implementing a media guidance application on equipment of the user, the media guidance application including a parental control mode.

39. The system as set forth in claim 38, wherein the media guidance application is an interactive program guide.

40. The system as set forth in claim 28, wherein the violation of the parental control restrictions by the commercial is detected based at least in part on image recognition of at least one object to be displayed in the commercial.

41. The system as set forth in claim 28, wherein the one or more keywords include a title of one of the commercials.

* * * * *